UNITED STATES PATENT OFFICE.

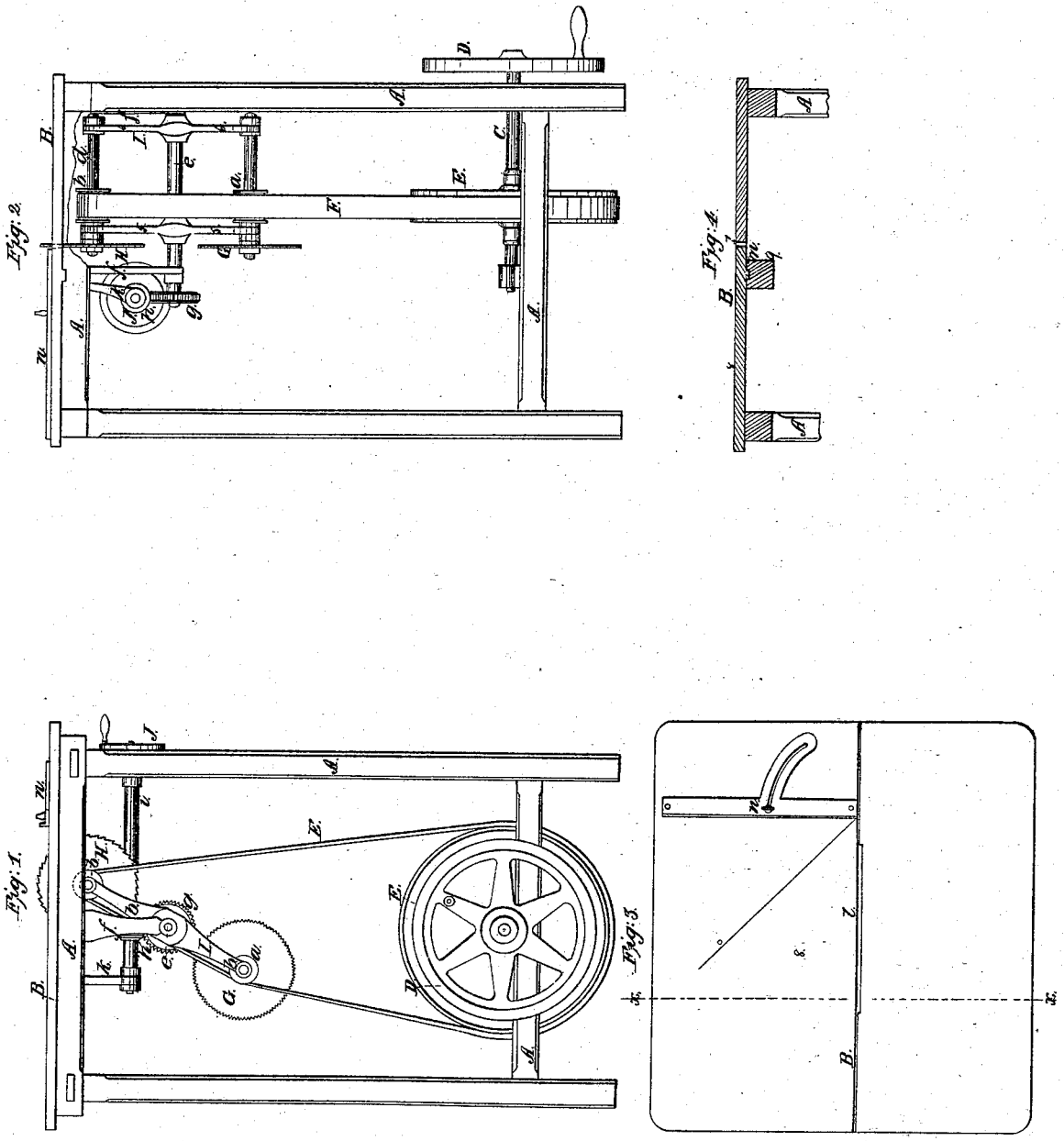

SALMON W. PUTNAM, OF FITCHBURG, MASSACHUSETTS, ASSIGNOR TO THE PUTNAM MACHINE COMPANY.

IMPROVEMENT IN SAWING-MACHINES.

Specification forming part of Letters Patent No. 57,046, dated August 7, 1866.

*To all whom it may concern:*

Be it known that I, SALMON W. PUTNAM, of Fitchburg, in the county of Worcester and State of Massachusetts, have invented an Improved Sawing-Machine, of which the following is a full, clear, and exact description, reference being had to the accompanying drawings, making part of this specification, in which—

Figure 1 is a side elevation of my improved sawing-machine. Fig. 2 is a rear elevation of the same. Fig. 3 is a plan. Fig. 4 is a vertical section through the same on the line $x\ x$ of Fig. 3.

Sawing-machines have been constructed in which two saws were hung in a swinging frame, so that either might be brought up through the table, as in the patent of C. P. S. Wardwell, dated March 10, 1857. The swinging frame, however, was so constructed and hung that it could only be turned a portion of a revolution in either direction, so that the saws were brought up through different parts of the table, and could not both be brought up into the same place on the working side of the table, as required.

My invention has for its object to overcome this objection; and it consists in a frame carrying one or more saws, and so constructed and arranged that it can be revolved entirely around to bring each saw up into the same place on the working side of the table in a convenient position for use.

To enable others skilled in the art to understand and use my invention, I will proceed to describe the manner in which I have carried it out.

In the said drawings, A is the frame-work, which supports the table B. C is the driving-shaft, which has its bearings in the frame-work and carries the driving-wheel D and pulley E, over which passes a belt, F, which is also led over the pulleys $a\ b$ of the arbors $c\ d$, which carry the cutting-off and splitting saws G H. These arbors have their bearings in a frame, I, which is composed of two pieces, 5 and 6, attached to a central shaft, $e$, having its bearings in hangers $f$, attached to the under side of the table B. This shaft $e$ carries at one end a gear, $g$, which is revolved by a worm-wheel, $h$, secured to a horizontal shaft, $i$, having its bearings in hangers $k$, secured to the under side of the table B, and this shaft is provided at one end with a hand-wheel, J, by turning which the frame I may be revolved entirely around, so as to bring either one of the saws G H up through the slot $l$, Figs. 3 and 4, into the required position on the working side of the table, more or less of the saw being exposed above the surface of the table, as may be desired. And it will be seen that by placing the pulleys $a\ b$ of the saw-arbors inside the frame I, and passing the belt directly over them and the pulley E, (instead of having the pulleys of the saw-arbors outside the frame and passing the belt over an intermediate pulley, as in Wardwell's patent, above mentioned,) the entire revolution of the saw-frame can be effected, thus securing the advantage of bringing either saw up into a convenient position for use; while, when the frame is so hung that it can only be turned a portion of a revolution, one of the saws is brought up through the table a considerable distance from its front edge in an inconvenient position.

If preferred, the frame I may be so constructed as to carry three or more saws of different descriptions or sizes.

The size of the pulley E is varied according to its distance from the central shaft, $e$, and the size of the frame I, so as to insure an equal strain on the belt F without regard to the position of the frame or saws.

The table B is made in two pieces, the portion 8 being provided on its under side with a projection or tenon, $m$, which slides in a groove made in one of the cross-braces 9 of the frame-work, so that the portion 8 may be pushed forward to bring the work which is laid thereon into contact with the saw.

$n$ is an adjustable gage, against which the work is laid to determine the angle of the cut.

What I claim as my invention, and desire to secure by Letters Patent, is—

So constructing and operating the frame I, which carries one or more saws, that it can be revolved entirely around and bring each saw to its desired position in respect to the table, when arranged substantially as described and for the purposes set forth.

S. W. PUTNAM.

Witnesses:
LOUIS D. BARTLETT,
CHARLES BURLEIGH.